Patented Feb. 21, 1933

1,898,336

UNITED STATES PATENT OFFICE

FRANK M. BOYLES, OF BROOKLYN, NEW YORK

FOOD JELLY

No Drawing. Application filed April 7, 1932, Serial No. 603,894, and in Canada December 12, 1931.

This invention relates to certain improvements in food jelly and has for its object the production of a jelly having an excellent flavor, which may be produced in either large or small quantities with expedition and a certainty not heretofore possible and without the necessity of cooking or straining.

As a further object of this invention it is proposed to prepare a compound which when mixed with syrup at a temperature less than that which would be present if cooking were resorted to, congeals into a jelly.

As a further object of this invention it is proposed to make use of a pectous concentrate, an acid and a flavoring, and an ingredient for converting mineral constituents in the pectous material into a non-hydrolyzable compound so that the jelly is always produced with certainty.

For further comprehension of the invention and of the objects and advantages thereof, reference will be had to the following description and to the appended claims in which the various novel features of the invention are more particularly set forth.

Heretofore, in making jellies, it has been necessary to cook or stew the fruit (usually with added water) and by a process of straining and squeezing obtain the jellifying ingredient from the fruit. To the cooked juices of many fruits thus obtained it is necessary to add lemon juice or acid from other sources. The acidified juice must then be cooked with sugar for a period in order to gain a product that will jellify.

Jellies thus made are seldom clear and sparkling and are more often quite cloudy and opaque unless the hot fruit juice is subjected to a plurality of straining steps. These jellies may have a pleasant flavor but they never have the delightful flavor of fresh fruit because the fruit from which they have been made has been cooked and the cooking of fruits results in a change in the flavor. Moreover, when the housewife makes a jelly she frequently finds that the product fails to "jel" because of insufficient cooking and she then has to resort to further cooking to produce a jellifying product.

The present invention overcomes all uncertainties as to the result of the product and enables the production of sparkling clear jelly with the flavor more nearly like fresh fruit and without either a straining or a cooking operation.

In carrying out the invention I provide a compound which includes unsweetened semi-liquid element consisting of a concentrated solution of pectin (obtained by any of the known methods), combined with the concentrated juices of fruits, preferably concentrated under a low temperature in a vacuum, so that the fresh fruit flavor is thus unimpaired, or with a flavor derived from other sources as essential oils and with a suitable acid. It may be instructive to explain that pectin is a gummy substance or a substance much in the nature of a gum, which exists naturally to a greater or lesser extent in the juices of pulp of all fruits from which jelly can be made. Such fruits as do not have a sufficient amount of pectin in their juices cannot be used in the making of jelly unless pectin is added from another source. Grapes, currants, and goose berries have a very large percentage of pectin while pineapples, strawberries, cherries, raspberries, loganberries have very little or no pectin and from such fruits or their juices jelly cannot be made unless pectin derived from some other source is added thereto. Pectin exists naturally in apples or in the pomace derived therefrom at the cider mill and in the rind of oranges and in many other sources not ordinarily used in the making of jelly from which the pectin can be extracted and this pectin derived from other sources and freed from the characteristic flavor of the fruit or other source from which it is obtained, can be combined with the concentrated juice of any fruit deficient in pectin, together with sugar and water, and jelly can be made therefrom having the flavor of the fruit from which the juice is taken.

Pectin, as it is obtainable either in solid or in syrup form is of widely varying characteristics in point of (1) jelly strength— that is the weight of sugar jelled by a given weight of pectin, and (2) time required to set with given quantity of acid. Pectin does not always quickly produce a jelly of proper and uniform consistency, particularly, several months after having been manufactured.

I have discovered that the inconsistencies above referred to are caused largely by variations in the mineral content (base forming salts) of pectous material, said mineral content being the normal variations of a vegetable product; or as is ofttimes the case, resulting through addition of basic mineral matter by the manufacturer as part of the process of the preparation of the pectin or pectin syrup. Such base forming mineral matter, I have reason to believe from extensive experiments and study, will in time unite with or inter-act with the pectous material, and also the proper amounts of organic or fruit acids used for the manufacture of the jelly—so as to repress the pH (the relation between the concentration of the hydrogen and the hydroxyl ions) below the marginal point for proper setting and thus render the entire process uncertain in that such repression of pH prevents proper consistency, delays setting or prevents setting altogether, although the proper amount of organic (fruit) acids and pectous material necessary for the manufacture has been duly added.

In order to overcome these vagaries in pectous material, ever increasing amounts of fruit acids mentioned would be without avail because the initial setting rate would then become too fast to be practical. Also, the resulting tartness would be in excess of what is required for most fruits and hence the palatability decreased or thoroughly destroyed.

I have discovered that the addition to the pectous material of minute quantities of hydrochloric acid or other mineral acids will completely overcome the above-mentioned inconsistencies natural to the pectous material, particularly with respect to the time required to "jel". The addition of hydrochloric acid to pectous material converts the basic alkali salt forming minerals into non-hydrolyzable compounds, i. e. sodium chloride (NaCl)—potassium chloride (KCl).

The fixation of sodium and potassium into non-hydrolized sodium chloride and potassium chloride by hydrochloric acid always permits the proper concentration of the H ions potentially available in the fruit acids whenever the ingredients of this invention are mixed with the proper amount of sugar and water, whether said mixture be made upon the same day of manufacture or varying lengths of time thereafter.

The addition of minute quantities of hydrochloric acid to any and all such pectous material as is used as raw material for the subject of this invention eliminates therefrom, or renders inoperative certain undesirable elements or compounds and thus tends to reduce all such pectous material to a common ground as regards freedom from interfering substances and thereby insuring that tests on their respective jelly strengths be reliable and the final product be uniform even after long periods of time.

The acid used in this invention, together with the pectous material, preferably is citric acid, but lactic, tartaric, malic, acetic or any of the organic acids may be used.

While the proportions and ingredients in the compound may be varied, excellent results have been gained in practice by the use of ninety-three and one-half percent by volume of concentrated pectin containing one hundredth per cent of hydrochloric acid; three per cent by volume of citric acid and three and one-half percent by volume of concentrated fruit juice or other flavoring.

The compound just described is produced and put into containers and sold to the trade so that the jelly maker can begin the jelly making operation with the product thus purchased. With the product at hand, the further steps to produce an excellent jelly are simple and as follows:—

An unflavored syrup is to be provided and this may readily be produced by simply dissolving a prescribed amount of sugar in a prescribed amount of water. This syrup will be more expeditiously produced if the prescribed amount of water for hastening the dissolving of the sugar be heated, though this is not necessary. Having produced or otherwise provided the unflavored syrup, the prescribed amount of the prepared compound is simply added to the syrup and stirred to affect a mixing or blending of the compound and syrup, which can be accomplished in a few seconds.

Immediately after the mixing or blending of the compound and syrup, and without any cooking or straining, the mixture will be poured into containers in which it quickly jellifies and produces a clear and sparkling jelly. It is to be noted that with the unsweetened but flavored compound at hand, the jelly may quickly and readily be produced by simply combining the compound with a prescribed quantity of syrup and no cooking or straining is necessary for the production of the completed jelly.

While I have illustrated and described my invention with some degree of particularity, I realize that in practice various alterations therein may be made. I, therefore, reserve the right and privilege of changing the form of the details or otherwise altering the arrangement of the correlated parts without departing from the spirit or the scope of the appended claims.

Having thus described my invention, what I claim as new, and desire to secure by Letters Patent of the United States is:—

1. A composition in liquid form, adapted to make jelly upon the addition of syrup, consisting of an organic acid, a flavouring, a pectous concentrate in solution with said organic acid and flavouring and having a mineral content of base forming salts, and a minute quantity of hydrochloric acid to convert said salts into a non-hydrolyzable compound, whereby a composition of substantially permanent jellifying ability is produced.

2. A composition in liquid form, adapted to make jelly upon the addition of syrup, consisting of an organic acid, a flavouring, a pectous concentrate in solution with said organic acid and flavouring and having a mineral content of base forming salts, and mineral acid to convert said salts into a non-hydrolyzable compound, whereby a composition of substantially permanent jellifying ability is produced.

In testimony whereof I affix my signature.

FRANK M. BOYLES.